United States Patent [19]

David et al.

[11] 4,348,634
[45] Sep. 7, 1982

[54] MANUAL CONTROL MEANS FOR CONTROLLING THE MOVEMENTS OF A MOTOR-DRIVEN ELEMENT

[75] Inventors: Roger J. P. David, Essonne; Maurice A. Lande, Paris, both of France

[73] Assignee: Association des Ouvriers en Instruments de Precision, Paris, France

[21] Appl. No.: 173,454

[22] Filed: Jul. 30, 1980

[30] Foreign Application Priority Data

Aug. 2, 1979 [FR] France .................. 79 19844

[51] Int. Cl.³ .............................. G05B 24/02
[52] U.S. Cl. ................. 323/353; 74/471 XY; 338/2
[58] Field of Search ............ 73/432; 74/469, 471 R, 74/471 XY; 324/176; 338/2; 323/318, 352, 353

[56] References Cited

U.S. PATENT DOCUMENTS

| | | |
|---|---|---|
| 3,832,895 | 9/1974 | Strandh . |
| 3,915,015 | 10/1975 | Crane et al. .................. 73/432 R |
| 3,991,618 | 11/1976 | Stampfer et al. ............. 73/432 R |
| 4,217,569 | 8/1980 | Nejedly et al. ..................... 338/2 |

Primary Examiner—William M. Shoop
Attorney, Agent, or Firm—Karl F. Ross

[57] ABSTRACT

Disclosed is a manual control means for motor-assisted manual control of a motor-driven member.

A control handle bears against the centre of a deformable diaphragm in the form of a cross. The outer end of each of the arms of the diaphragm is mounted to pivot freely in a fixed support means. When the diaphragm is deformed by movements of the handle, pairs of strain gauges attached to each of the arms produce electrical signals which are processed for use to control the motor-driven member to cause it to be driven in the sense of the movement of the handle.

8 Claims, 4 Drawing Figures

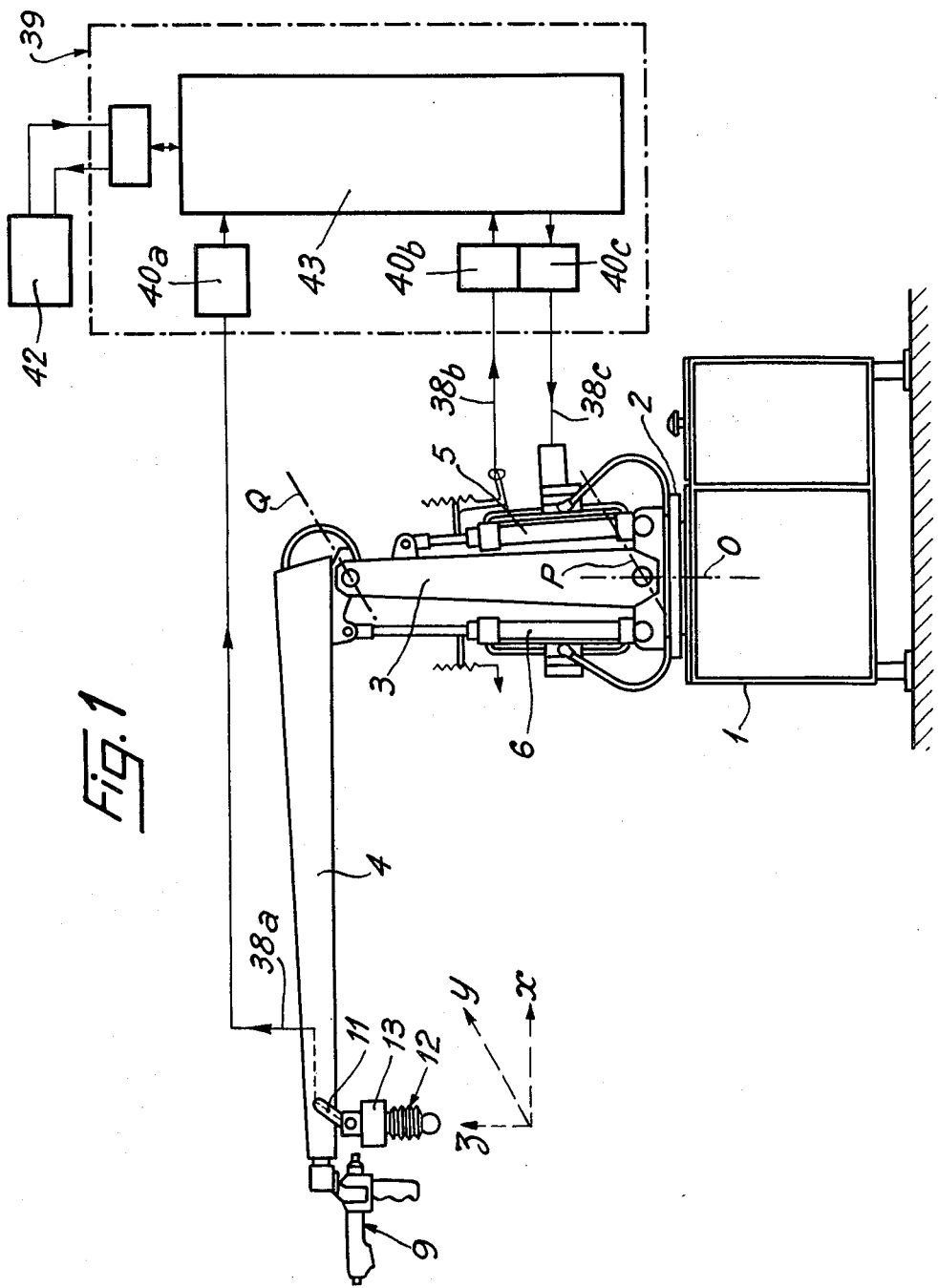

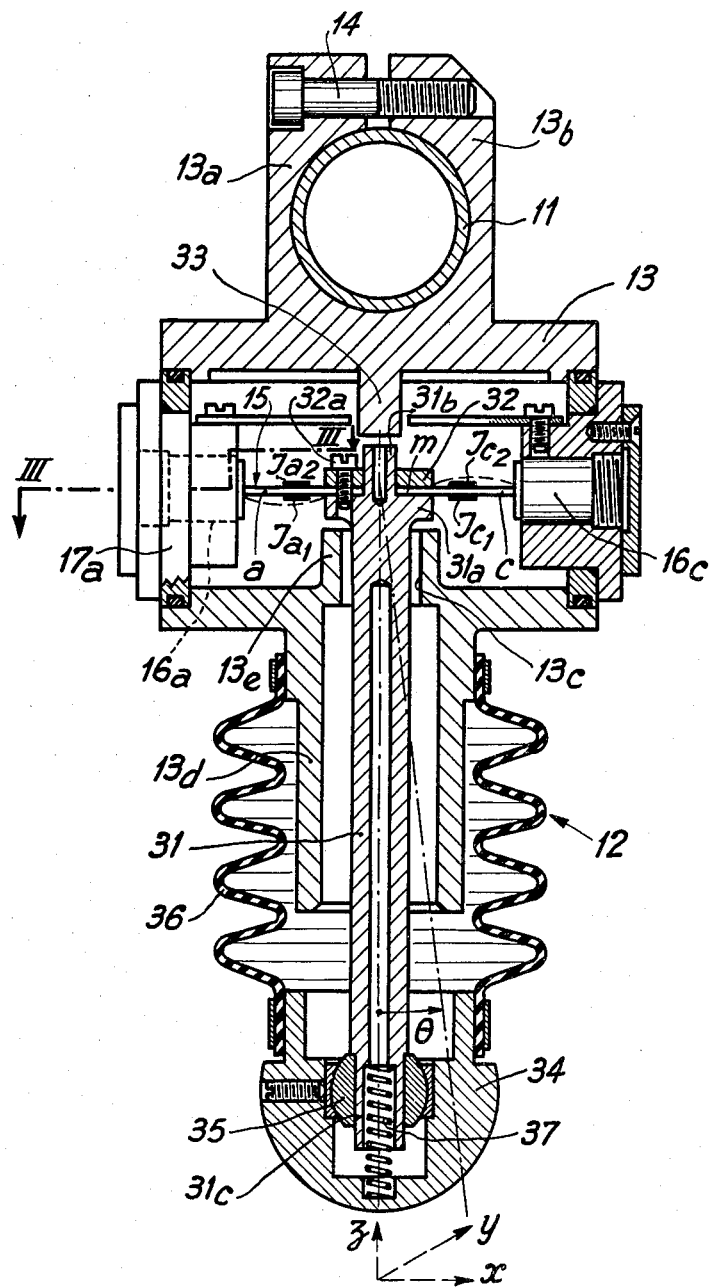

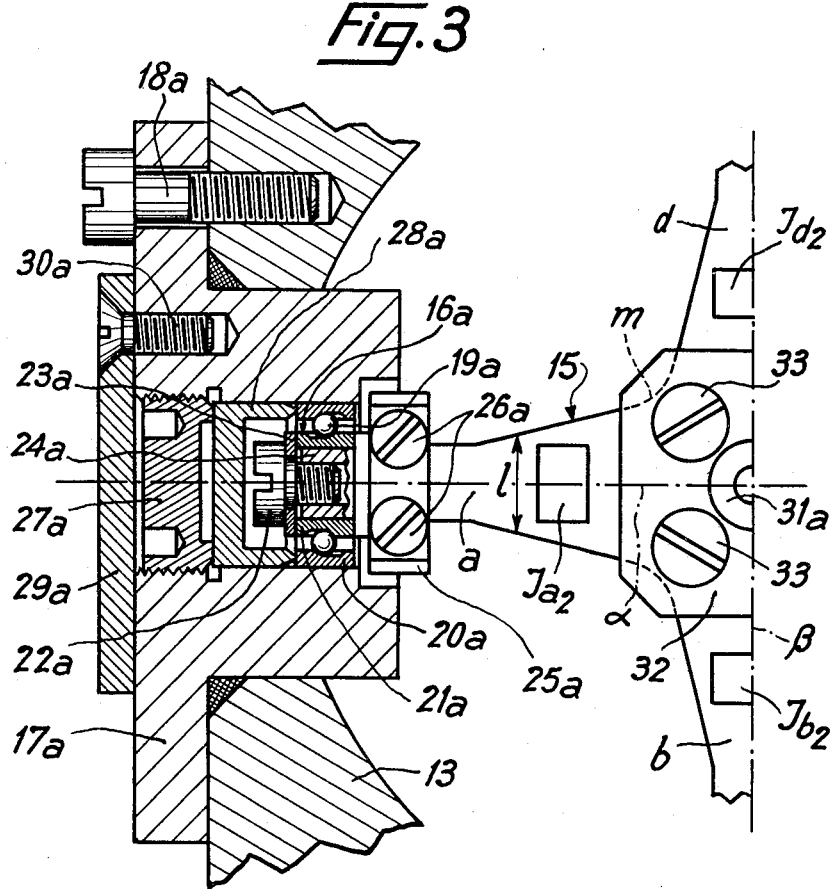
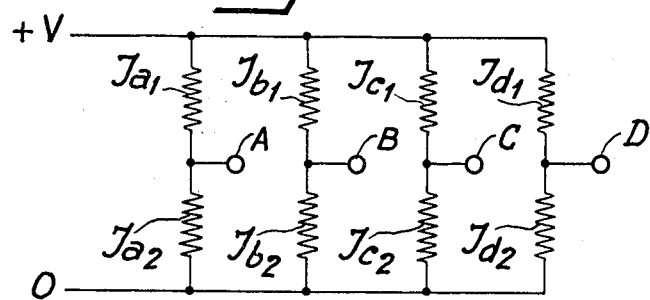

MANUAL CONTROL MEANS FOR CONTROLLING THE MOVEMENTS OF A MOTOR-DRIVEN ELEMENT

FIELD OF THE INVENTION

The present invention concerns a manual control means, for controlling the movements of a motor-driven element in three perpendicular directions.

DESCRIPTION OF THE PRIOR ART

French Patent Application No. 78.20513, filed on 10th July, 1978 was entitled "Controllable manual implement, in particular an automatic painting device" described a means comprising a handle for manually controlling the movements, in three perpendicular directions, of the arm of a manual implement, in particular an automatic painting device. This manual control means comprises a deformable diaphragm in the form of a cross, the central portion of which is subjected to the action of the handle, and each of its arms carrying a pair of strain gauges, secured one on each of the two faces of each arm.

SUMMARY OF THE INVENTION

The present invention concerns various improvements to the manual control means described in the above-mentioned French Patent Application, these improvements, however, being applicable to all manual control means of the previously indicated type, whether or not they are associated with manually operated or automatic implements.

The manual control means in accordance with the present invention also comprises a deformable diaphragm in the form of a cross, the central portion of which is subjected to the action of the handle, each of its arms carrying a pair of strain gauges, secured one on each of the two faces of each arm. The end of each arm of the diaphragm is connected to an element solidly attached to the element to be moved, by way of a support means, which is so designed as to enable the corresponding arm of the diaphragm to turn, without torsion, about its longitudinal axis when the handle is subjected to a force applied in the direction perpendicular to this axis.

Because of this means in accordance with the present invention, any force or force component applied to the control handle in a direction parallel with the axes of two arms of the diaphragm in the form of a cross has the effect of deforming these two arms only, whereas the two other arms, perpendicular to the direction in which the force is applied, turn, without being deformed and, in particular, without being twisted; the force or the force component applied is thus picked up only by the strain gauges secured to the arms parallel with the direction in which this force is applied, whereas the strain gauges secured to the other two arms, perpendicular to the direction of the force, are practically unaffected by the force. This considerably facilitates the processing, particularly by electronic circuits, of the electric signals produced by the four pairs of strain gauges secured to the arms of the deformable diaphragm. Thus, it will be understood that the invention permits ready separation of the signals corresponding to the components of the forces applied to the control handle in the three perpendicular directions mentioned.

In a preferred construction of the manual control means of the invention, that portion of each arm of the diaphragm that extends from its central portion to the support means associated with the end of the arm, is at least partially in the form of a trapezium, the width of which diminishes in the outwards direction. The effect of this arrangement is to regulate the longitudinal curvature assumed by each arm of the diaphragm when the control handle is subjected to a force in the longitudinal direction of this arm.

Typically the end of each arm of the diaphragm is mounted in the corresponding support means preferably in a manner to enable it to slide freely relatively to said support, in the longitudinal direction of this arm. This arrangement facilitates deformation, particularly the longitudinal curvature, of each arm of the diaphragm when the control handle is subjected to a force in the longitudinal direction of this arm.

To produce electrical control signals for the motor-driven element, the manual control means of the present invention is preferably designed in the following manner: the pairs of strain gauges secured to each of the different arms, a, b, c and d of the diaphragm, are arranged in series electrically between the terminals of an electric current source in such a way that the longitudinal curvature assumed by each arm of the diaphragm when the control handle is subjected to a force applied in the longitudinal direction of this arm causes a voltage A, B, C or D to be produced at the points common to a corresponding pair of gauges. Electric circuits of a known kind are provided so as to derive therefrom electric signals which are proportional respectively to the forces to which the control handle is subjected in the three perpendicular directions:

$X = A - C;\ Y = B - D;\ Z = A + C - B - D$.

According to a further advantageous feature of the invention, a push-button, which may be hemispherical, may be connected, by means of a ball-and-socket joint to the free end of the control handle or its rod. When the operator operates the control handle by simply pushing the push-button, the torsional couples which he may apply, even involuntarily, to said push-button when he displaces the handle, are not transmitted to the central rod of the handle because of the interposed ball-and-socket joint, so that the rod of the control handle is affected only by the translatory components of the force applied to the push-button, these components being the only ones that are to be picked up by the strain gauges secured to each of the arms of the deformable diaphragm.

Where the supports associated with each of the arms of the diaphragm are mounted on the walls of a case enclosing the diaphragm and itself solidly connected to the member to be displaced, the push-button can be advantageously connected to the base of the case by a flexible sleeve, preferably in the form of a bellows, which surrounds, without touching, that portion of the rod of the control handle that projects freely from said base. The handle itself, which is held by the operator, is then in effect formed by the push-button and the flexible sleeve which connects it to the base of the case where the deformable diaphragm is housed.

DESCRIPTION OF THE DRAWINGS

By way of example, there will now be described, by reference to the attached diagrammatic drawings, a form of construction of the manual control means in accordance with the present invention, as used in controlling the movements of the arms of an automatic painting implement. In the drawings:

FIG. 1 is a diagrammatic elevational view of an automatic painting implement equipped with a manual control means in accordance with the invention;

FIG. 2 illustrates the manual control means of FIG. 1 in section along a plane passing through the axis of its control handle;

FIG. 3 is a partial sectional view along the line III—III of FIG. 2;

FIG. 4 is a connection diagram relating to the four pairs of strain gauges secured to the deformable diaphragm of the control means illustrated in FIGS. 2 and 3.

DESCRIPTION OF THE PREFERRED EMBODIMENT

The automatic painting implement illustrated diagrammatically in FIG. 1 may be of the type described in French Patent Application No. 78 20513 previously referred to. It comprises a case on which is mounted a turret 2 rotatable about a vertical axis 0 by the action of a motor housed in the case 1. The lower end of an arm 3 is articulated on the turret 2 to enable it to pivot about a horizontal axis P. Mounted at the upper end of the arm 3 is a cross-arm 4, one end of which is articulated to enable it to pivot about a horizontal axis Q. Two piston- and cylinder units 5 and 6 are mounted to control the pivotal movements of the arms 3 and 4 respectively about their articulation means. The free end of the cross-arm 4 carries a paint gun 9. A dependent tubular member 11 extends from the cross-arm 4 at a short distance from the end carrying the gun 9. The member 11 is designed to carry a manual control handle 12 at a certain distance from the cross-arm 4; the arrangement is such that an operator is able to hold the butt of the paint gun 9 in his right hand, and the manual control handle 12 in his left hand.

As can be seen in FIGS. 2 and 3, a case 13 is fitted between the control handle 12 and the dependent tubular member 11, and two jaws 13a and 13b, integral with the upper portion of said case 13, grip the tubular member 11 with the aid of a screw-bolt 14. Housed within the case 13 is a deformable diaphragm 15 in the form of a cross, the four arms of which will be referred to hereinafter by the letters a, b, c and d. According to the present invention, the end of each of the arms a to d of this diaphragm 15 is attached to one of the walls of the case 13 by way of a support means 16a, 16b, 16c or 16d respectively, which is fitted in the corresponding side wall of the case 13.

In the arrangement illustrated partially and in section and on a large scale in FIG. 3, each support means, such as the support 16a, is housed in the central bore of a closure disc 17a the body of which is fitted in a corresponding hole formed in the wall of the case 13; a collar of said closure disc 17a is secured to the wall by screws such as 18a. That part of each arm, e.g. the arm a, of the diaphragm 15 that extends from its central portion m to the support means 16a associated with the end of the arm a, is partly formed as a trapezium, having a width l which diminishes in the direction away from the central portion m. Each support means, such as the support means 16a, comprises at least one ball-bearing unit 19a, the outer race 20a of which is held in the central bore of the closure disc 17a by a force fit, whereas its inner race 21a is immobilised by a screw 22a and a washer 23a on the cylindrical barrel 24a of a part fitted in the central bore of the closure disc 17a; towards the exterior of the central bore of the closure disc 17a, the cylindrical barrel 24a is extended by a substantially cylindrical part 25a which is solidly connected thereto and comprises a slot arranged to receive the free end of the arm a of the deformable diaphragm 15; this free end of the arm a is preferably expanded to enable it to be gripped in the slot in the part 25a by two screws 26a. On the other hand, as can be seen in FIG. 3, the races 20a and 21a of the ball bearing unit 19a are formed to permit limited axial displacement of the inner race 21a in relation to the outer race 20a; since the end of the arm a of the deformable diaphragm 15 is integral with the parts 25a, 24a and 21a, this arrangement permits the end of each arm, such as the arm a, of the diaphragm 15 to slide freely in the longitudinal direction $\alpha$ of said arm a in relation to the elements of the support 16a which are solidly connected to the wall of the case 13. This applies in particular to the outer race 20a, which is axially immobilized in the axial bore of the closure disc 17a by a stopper 27a screwed into the outermost portion of this central bore so as to clamp an intermediate piece 28a against the outer race 20a. The central bore of the disc 17a is then normally closed off by a cover plate 29a which is secured by screws such as 13a. This arrangement offers the advantage of enabling each of the supports, such as the support 16a, to be removed from outside the case 13. The central portion m of the deformable diaphragm 13 is, on the other hand, secured to the upper end of a rod 31 which passes freely through the bottom of the case 13 by way of a hole 13c formed in the bottom. The outer end of the hole 13c is surrounded, outside the case 13 and below its bottom, by a tubular ferrule 13d which surrounds the upper portion of the rod 31 without touching it. The upper end of this rod 31 carries, on the other hand, an overhanging collar 31a on to which the central portion m of the deformable diaphragm 15 is clamped by a part 32 and by screws such as screw 32a, so as to embed said central part m into the upper end of the rod 31. The upper end 31b of this rod 31 extends through a central bore in the diaphragm 15 and extends above the part 32, as shown in FIG. 2, towards an axial stop 33 formed in the upper wall of the case 13. According to the present invention, a hemispherical push-button 34 is connected, by means of a ball-and-socket joint 35, to the free lower end 31c of the rod 31. In the arrangement under consideration, this hemispherical push-button 34 is connected to the bottom of the case 13, and in particular to the upper portion of the ferrule 31d which extends it downwardly by means of a flexible sleeve 36 in the form of a bellows and made of leather, for example, which surrounds without touching the portion of the rod 31 which is exterior of the tubular ferrule 13d of the case 13. The control handle 12, which is gripped by the operator, is thus mainly formed by the push-button 34 and possibly by the lower portion of the flexible sleeve 36, which is attached to said push-button. To prevent the diaphragm 15 from being deformed when no force is applied to the control handle 12, a spring 37 is inserted between the respective bottoms of the two coaxial cavities, one of which is formed in the push-button 34 and the other in the lower end 31c of the rod 31, so as to offset the weight of said rod 31.

According to the present invention, pairs of strain gauges such as Ja1 and Ja2 are secured, for example bonded, one to each of the two faces of each arm, such as the arm a of the deformable diaphragm 15. The pairs of strain gauges, each secured to a respective arm a, b, c and d of the diaphragm 15 are arranged, in series electrically, as illustrated in FIG. 4, between the terminals of an electric supply, in particular a D.C. supply, and electrical signals A, B, C and D are picked up, respectively, at the points common to the various pairs of gauges, such as the gauges Ja1 and Ja2 arranged in series. These four electrical signals A to D are applied respectively to the four leads of a cable 38a which passes through the cross-arm 4 by way of the dependent tubular member 11 to an automatic control means 39. The cable 38a terminates in an assembly of electrical circuits 40a of known type which are designed to output electrical signals $X=A-C$, $Y=B-D$, and $Z=A+C-B-D$. Signals, X, Y and Z are proportional respectively to the forces applied by the control handle 12 in three directions perpendicular to each other which have been designated by the letters x, y and z respectively, the direction z being vertical, and the two directions x and y being horizontal, and these directions being so selected that when the turret 2 of the automatic painting implement of FIG. 1 as well as its arm 3 and 4 occupy predetermined rest positions and no force is applied to the control handle 12, the longitudinal direction $\alpha$ of the arms a and b of the deformable diaphragm 15 is parallel with the direction x, whereas the longitudinal direction $\beta$ of its arms c and d is parallel with the direction y.

The automatic control means 39 is also connected to a memory store 42 of known type, and furthermore comprises a microprocessor 43, an interface 40b to which are electrically connected, through a cable 38b, devices for picking up displacements about the three axes O, P and Q, as well as an interface 40c which transmits control signals through a cable 38c to the respective motors for the turret 2 and the arms 3 and 4 (the piston-and-cylinder units 5 and 6).

The automatic painting implement above described is used in the following manner:

With the automatic painting implement occupying its rest position as defined above, the operator, using his left hand, first applies to the control handle 12 forces suitable for bringing the gun 9 into a predetermined position in which, using his right hand, he will then point the gun 9 in the selected direction. To facilitate understanding of the mode of operation of the control handle 12, it will be supposed, for example, that the operator first applies to the handle 12 a horizontal pulling force in the direction x, which has the effect of causing the geometrical axis of the previously vertical control rod 31 to pivot in a vertical plane parallel with the direction x, the pivoting movement being over an angle $\theta$ in the counter-clockwise direction. Because of the anchoring of the ends of the two arms a and c of the diaphragm 15, the longitudinal direction of which is parallel to x, the arms a and c of the diaphragm are deformed, as indicated in broken lines in FIG. 2, in such a way that their respective middle fibres assume regular and practically constant curvatures because of the trapezoidal form of the arms a and c. Regularity in the deformation of the arms a and c of the diaphragm is further promoted by the unimpeded sliding of their ends relatively to the fixed portions of the corresponding support means 16a and 16c. On the other hand, the two other arms, b and d of the diaphragm 15, the longitudinal direction $\beta$ of which is perpendicular to the direction x of the force applied manually to the handle 12, pivot together through an angle $\theta$ in such manner as to remain practically perpendicular to the axis of the rod 31 because of the pivoting of their ends in the corresponding supports (not illustrated). Consequently, there occur, at the points common to the respective different pairs of strain gauges, signals A and C of practically equal amplitude but of different sign, and signals B and D of practically zero amplitude. As a result, of the three electrical signals derived by the circuit 40a (FIG. 1), only the signal $X=A-C$ is not zero; it can also be easily shown that it is proportional to the relative variation in the length of each of the arms a and c of the diaphragm 15 under the effect of the bending moment applied to these arms through the rod 31, and therefore substantially proportional to the force applied to said rod in the direction x. If, on the other hand, the operator applies to the control handle 12 a force in the horizontal direction y, then the arms b and c of the diaphragm 15 become curved and the circuit 40a produces a single non-zero signal, $Y=B-D$, which is directly proportional to this horizontal force. On the other hand, in the case where the operator applies to the handle 12, and in particular to its push-button 34, a force in the vertical direction z, then it is the four arms a to d of the diaphragm 15 which, for example, are curved in such a way as to exhibit substantially equal curvatures which are turned downwards if the force is an increasing one; in this case, $A=C$ and $B+D$ since the only non-zero signal produced by the circuit 40a is $Z=A+C-B-D$, which is again proportional to the force applied. In the more general case where the force applied by the operator to the control handle 12 has non-zero components in the three perpendiculars x, y and z, it is obvious that the circuit 40a produces three signals X, Y and Z each proportional to the component corresponding to the force applied. If, by operating the handle 12 and in particular, its push-button 34, the operator applies to the latter a torsional couple, this is not transmitted to the control rod 31 nor, consequently, to the deformable diaphragm 15 because of the presence of the interposed ball-and-socket joint 35. Of course, the various movements of the rod 31 relative to the case 13 are limited by suitable stops. Mention has already been made of the axial stop 33 (FIG. 2), which limits vertical upward movements of the rod 31; its vertical downward movements are limited to the collar 31a solidly connected to the upper part of the rod 31, contacting an annular projection 13e within the case 13 which surrounds the opening 13c. This same annular projection 13e serves to limit angular judder of the rod 31 under the effect of horizontal components of the forces applied to the handle 12.

The electrical signals X, Y and Z which are produced by the circuit 40a when the operator applies forces to the control handle 12 are transmitted to the microprocessor 43 at the same time that the interface 40b transmits thereto electrical signals indicating the position of the various movable members 2, 3 and 4 of the automatic implement. On the basis of these data, the microprocessor 43 processes the electrical control signals which are transmitted to the motors of the movable members 2, 3 and 4 respectively by way of the interface 40c and the cable 38c.

The microprocessor 43 is so programmed that the above-mentioned motors apply to the various movable members 2, 3 and 4 forces, the resultant of which is parallel with, in the same direction as, and proportional to, the force that is manually applied by the operator to the control handle 12, which forces have components X, Y and Z, the coefficient of proportionality being selected so that they are considerably greater than unity, so as to obtain a multiplication of said manual effort that is sufficient to overcome the inertia and internal friction of the automatic means.

In the case of the controllable automatic means here considered, the successive values of the signals for the positions of the movable members 2, 3 and 4 which are received by the interface 40b are registered in succession in the memory store 42. Following this phase, the contents of the store 42 can be read off, the memory signals, treated by the microprocessor 43, being transmitted in turn through the interface 40c and the cable 38c to the motors of the respective movable members 2, 3 and 4 in such a way that the end of the cross-arm 4, which carries the paint gun 9, automatically executes the same movements as in the preceding control phase wherein the operator controlled these movements by actuating the handle 12.

The manual control means that has been described is not designed exclusively for the manual control of movements of an automatic painting implement; it may be used for controlling the movements, in three perpendicular directions, of the arm of an automatic means or manipulator of any kind or even, more generally, of any motor-driven member. Nor is the present invention limited to the form of construction, described above, of the manual control means as variants thereof within the spirit and scope of the invention readily occur to those skilled in the art. For example the strain gauges Ja1 and Ja2 may be replaced by flat devices of any other suitable type that pick up deformation or strain. The push-button 34 and its attachment sleeve 36 are optional; however, if they are not present, the torsional couples which the operator may apply to the rod 31, on which a smaller control handle 12 is provided, produce specific deformations of the diaphragm 15 so that the use of the electrical signals produced by the flat means for picking up deformation or strain, in particular the strain gauges Ja1 to Jd2, may require relatively more complicated electronic circuits. The fitting of the deformable diaphragm 15 in a case 13 as well as the form of construction of this case are matters of choice. The same is true as regards the electrical arrangement of the various strain gauges Ja1 to Jd2, which arrangement is illustrated in FIG. 4. The ball-bearing units, such as that shown at 16a, can be replaced by equivalent bearings of some other known type; instead of providing for the possibility of axial sliding between the two races 20a and 21a of each ball-bearing unit 16a, or of each equivalent bearing unit, it is also possible to provide for the free end of the corresponding arm a of the diaphragm 15 to slide freely in relation to the rotating part of the bearing. The shape of each arm of the deformable diaphragm 15 is a matter of choice.

The embodiments of the invention in which an exclusive property or privilege is claimed are defined as follows:

1. A manual control means for controlling the movements of a motor-driven element in three perpendicular directions, said means comprising a deformable diaphragm in the form of a cross including a central portion and projecting arms, the central portion of which is subjected to the action of a manually displaceable handle acting on the said central portion, a pair of strain gauges secured one on each of the two faces of each arm, and a support means connecting the free end of each arm of the diaphragm to means solidly attached to the element to be moved, said support means enabling the corresponding arm of the diaphragm to turn, without torsion, about its longitudinal axis when the handle is subjected to a force applied in the direction perpendicular to said axis.

2. A manual control means according to claim 1, wherein the portion of each arm of the diaphragm that extends between the said central portion and the said support means associated with such arm is at least partially in the form of a trapezium the width of which diminishes in the direction away from said central portion.

3. A manual control means according to claim 1 or claim 2, wherein the end of each arm of the diaphragm is mounted in the corresponding support means in a manner to enable it to slide freely relatively to said support means in the longitudinal direction of the arm.

4. A manual control means according to claim 1, wherein the pairs of strain gauges secured to each of the different arms of the diaphragm are arranged in series electrically between the terminals of an electric current source in such a way that the longitudinal curvature assumed by each arm of the diaphragm when the control handle is subjected to a force applied in the longitudinal direction of this arm causes a voltage A, B, C or D to be produced at the points common to a corresponding pair of gauges, and means for deriving from said voltages electrical signals which are proportional respectively to the forces to which the control handle is subjected in the three perpendicular directions:

$X = A - C; Y = B - D; Z = A + C - B - D.$

5. A manual control means according to claim 1, wherein each support means comprises a ball-bearing unit mounted on the wall of a case which surrounds said diaphragm and is secured to the element to be displaced, the said handle projects into the case through the base thereof and said central portion of said diaphragm is locked on to that end of said handle that is disposed within said case.

6. A manual control means according to claim 5, comprising a hemispherical push-button connected by a ball-and-socket joint to the free end of said handle.

7. A manual control means according to claim 6 further comprising a flexible bellows connecting the push-button to said base of said case, said bellows being in non-contacting relation with said handle.

8. A manual control means according to claim 5, comprising stops within said case to limit displacement of said handle.

* * * * *